Jan. 5, 1926.
A. SHUTT
1,568,248
BANJO RESONATOR
Filed March 31, 1924
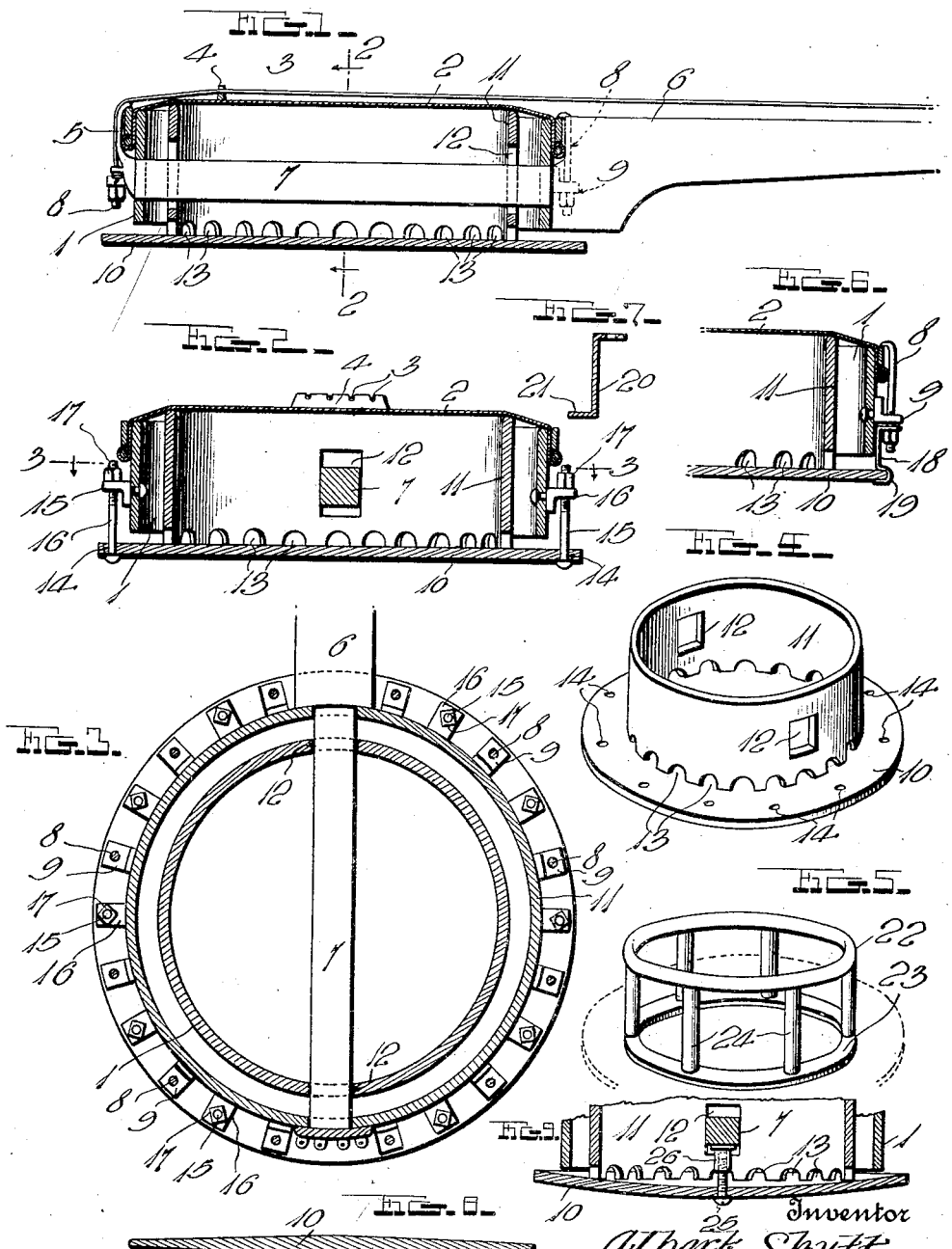

Patented Jan. 5, 1926.

1,568,248

UNITED STATES PATENT OFFICE.

ALBERT SHUTT, OF TOPEKA, KANSAS.

BANJO RESONATOR.

Application filed March 31, 1924. Serial No. 703,193.

*To all whom it may concern:*

Be it known that I, ALBERT SHUTT, a citizen of the United States, residing at Topeka, in the county of Shawnee and State of Kansas, have invented certain new and useful Improvements in Banjo Resonators; and I do declare the following to be a full, clear, and exact description of the invention, such as will enable others skilled in the art to which it appertains to make and use the same.

The object of my invention is to provide a simple and inexpensive resonator which may be easily attached to an ordinary banjo, banjo-ukulele, banjo-mandolin, etc., to improve the tone and increase the volume thereof, the device preferably comprising a supplemental rim within the banjo rim and interposed between the usual skin and a sound-board which is connected with the banjo, said supplemental rim having an edge engaging the skin and exerting outward pressure on the latter.

With the foregoing in view, the invention resides in the novel subject matter hereinafter described and claimed, the description being supplemented by the accompanying drawing.

Figure 1 is a longitudinal sectional view of a banjo embodying my improvement.

Figure 2 is a transverse sectional view as indicated by line 2—2 of Fig. 1.

Figure 3 is a horizontal section on line 3—3 of Fig. 2.

Figure 4 is a perspective view of the sounding board and the supplemental rim shown in Figs. 1 to 3.

Figure 5 is a perspective view showing a different form of supplemental rim.

Figure 6 is a detail sectional view illustrating a different manner of connecting the sounding board with the banjo rim.

Figure 7 is a detail section of a different form of connector which may be used in attaching the sound board to the rim.

Figure 8 is a sectional view indicative of one of the many other forms in which the sounding board may be constructed.

Figure 9 is a vertical sectional view showing a still further modification of construction.

In the drawings above briefly described, the invention has been shown in connection with an ordinary banjo including the usual rim 1, skin 2, strings 3, bridge 4, tail-piece 5, neck 6 with its dowel 7 extending across the rim 1, and tightening bolts 8 for the skin 2, engaged with the usual rim-carried brackets 9.

In spaced relation with the rim 1 and skin 2, I provide a sounding board 10 which is preferably constructed from wood and may either be of uniform thickness as shown in Figs. 1 and 2, of graduated thickness as illustrated in Fig. 8, or of any other desired design. This sounding board is preferably of somewhat greater diameter than the rim 1 and is spaced outwardly from the edge of the rim 1, remote from the skin 2.

Between the skin 2 and the sounding board 10, I provide means exerting an outward force on said skin and re-acting against said sound board. In the form of construction illustrated in Figs. 1, 2, 3, 4 and 6, the means in question consists of a continuous supplemental rim 11 having openings 12 through which the dowel pin 9 passes. This rim is formed with sound escape openings 13 which are shown adjacent the sounding board 10 but could be otherwise located if desired.

The board 10 is connected in any suitable manner with the rim 1. In the form of construction illustrated in Figs. 1 to 4, this board is formed with openings 14 at suitable intervals through which headed bolts 15 pass, said bolts being extended through brackets 16 secured to the rim 1 and having adjusting nuts 17. By adjusting these nuts, the rim 11 may be adjusted to force outwardly to a greater or lesser extent, upon the skin 2. This rim is somewhat greater in width than the rim 1, to project a suitable distance beyond both edges of the latter, and the difference in diameter of the two rims, is sufficient to provide a space between them, as shown.

As hereinafter more fully set forth, the rim between the sounding board 10 and the skin 2, may be of any suitable design. Similarly, the connecting means between the sounding board and the rim 1, may be varied in numerous ways. In Fig. 6, I have illustrated strip metal connectors 18 held at one end by the nuts of the bolts 8 and provided at their other ends with hooks 19 engaging the edge of the sounding board. A similar connecting strip 20 is shown in Fig. 7, whose upper end co-acts in the same manner with the nut of the bolt 8, while its lower end is extended laterally as indicated at 21 to merely contact with the outer side of the sounding board 10 or to be suitably secured to said board.

As above stated, the rim between the skin and the sounding board 10 may be of any suitable construction, as will be clear by comparing the constructional form illustrated in the figures so far described, and the rim shown in Fig. 5. In the last named figure, a supplemental rim is shown to act in the same capacity as the rim 11, said supplemental rim being composed of a pair of spaced rings 22 and 23, connected at intervals by spokes or the like 24. The ring 23 which contacts with the sounding board 10 may well be flat, but the other ring is mounted to engage the skin 2.

In Fig. 9, a dished sound board 10 is shown adjustably connected at its center to the dowel pin 7 by a screw 25 and socket 26, and with this sound board, I have shown the auxiliary rim 11 within the main rim 1, although any other desired form of auxiliary rim could be used.

Excellent results may be obtained by the use of the invention in connection with numerous forms of banjos such as those above enumerated, and it has been found that both the tone and the volume of the instrument will be improved.

Any form of construction herein disclosed, may be followed, or any other equivalent construction, and I wish it clearly understood that the present disclosure is for illustrative purposes only. Moreover, it is to be distinctly understood that the term "banjo" used in claiming the invention, is intended to apply to any other instrument analogous to a banjo and embodying a rim, with a skin stretched across the same.

I claim:

In a banjo having a main rim, a skin, and means anchoring the edge of the skin to the rim; a floating supplemental rim independent of said anchoring means and spaced inwardly from the main rim, said supplemental rim being of greater width than said main rim and projecting beyond both edges of the latter, one edge of said supplemental rim being in contact with the skin, a thin resonant sound board contacting with the other edge of said supplemental rim and spaced outwardly from the adjacent edge of the main rim, said sound board being of a diameter greater than the internal diameter of said main rim, and means at the outer periphery of the main rim anchoring the edge of said sound board to said main rim, said supplemental rim being free of anchorage other than that afforded by engagement of its edges with the skin and sound board, whereby it may float and directly impart vibrations of said skin to said sound board, openings being formed in said supplemental rim to permit escape of vibrations therefrom.

In testimony whereof I have hereunto affixed my signature.

ALBERT SHUTT.